United States Patent
Ja et al.

(10) Patent No.: US 10,855,463 B2
(45) Date of Patent: Dec. 1, 2020

(54) SYSTEM AND METHOD FOR PROVIDING QUALITY OF SERVICE DURING TRANSPORT KEY ROTATION AT A DISTRIBUTED MANAGEMENT CONTROLLER GROUP

(71) Applicant: Dell Products L.P., Round Rock, TX (US)

(72) Inventors: Yee Ja, Round Rock, TX (US); Marshal F. Savage, Austin, TX (US); Cyril Jose, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 15/892,036

(22) Filed: Feb. 8, 2018

(65) Prior Publication Data

US 2019/0245687 A1 Aug. 8, 2019

(51) Int. Cl.
- *H04L 29/06* (2006.01)
- *G06F 21/00* (2013.01)
- *H04L 9/08* (2006.01)

(52) U.S. Cl.
CPC ........ *H04L 9/0891* (2013.01); *H04L 63/0428* (2013.01); *H04L 63/065* (2013.01);
(Continued)

(58) Field of Classification Search
CPC . H04L 9/0891; H04L 63/065; H04L 63/0428; H04L 63/068; H04L 63/205; H04L 2463/121
See application file for complete search history.

(56) References Cited

U.S. PATENT DOCUMENTS 6,295,361 B1 * 9/2001 Kadansky ............... H04L 29/06
                                                        380/273
9,887,836 B1   2/2018 Roth
(Continued)

FOREIGN PATENT DOCUMENTS

GB          201503762      *  4/2015  ......... G06Q 20/4012

OTHER PUBLICATIONS

Wikipedia contributors. (Oct. 8, 2018). Replay attack. In *Wikipedia, The Free Encyclopedia*. Retrieved 21:49, Feb. 5, 2019, from https://en.wikipedia.org/w/index.php?title=Replay_attack&oldid=863032627; 6 pages, Oct. 8, 2018.
(Continued)

*Primary Examiner* — Lisa C Lewis
(74) *Attorney, Agent, or Firm* — Baker Botts L.L.P.

(57) ABSTRACT

Methods and systems for providing quality of service to an information handling system may involve generating a new transport encryption key for a management controller group, notifying nodes in the management controller group to negotiate for the new transport encryption key, and encrypting a first message to be sent to a first node in the management controller group using a current transport encryption key. The new transport encryption key for encrypted communications in the management controller group and to replace a current transport encryption key. The first message encrypted after notifying the nodes in the management controller group to negotiate for the new transport encryption key. The nodes of the management controller group including the first node.

17 Claims, 7 Drawing Sheets

(52) U.S. Cl.
CPC .......... *H04L 63/068* (2013.01); *H04L 63/205* (2013.01); *H04L 2463/121* (2013.01)

(56) References Cited

U.S. PATENT DOCUMENTS

| | | |
|---|---|---|
| 2014/0093082 A1* | 4/2014 | Jung .................... H04L 9/0891 380/270 |
| 2016/0218866 A1 | 7/2016 | Patil et al. |
| 2016/0344582 A1 | 11/2016 | Shivanna et al. |
| 2016/0365975 A1 | 12/2016 | Smith |
| 2017/0026144 A1 | 1/2017 | Zinner |
| 2017/0126404 A1 | 5/2017 | Unagami et al. |
| 2017/0171950 A1* | 6/2017 | Barna ................. H04L 12/2827 |
| 2018/0019869 A1 | 1/2018 | Savage et al. |

OTHER PUBLICATIONS

Wikipedia contributors. (Jun. 12, 2018). Lamport timestamps. In *Wikipedia, The Free Encyclopedia*. Retrieved 21:50, Feb. 5, 2019, from https://en.wikipedia.org/w/index.php?title=Lamport_timestamps&oldid=845598900; 4 pages, Jun. 12, 2018.

Wikipedia contributors. (Jan. 27, 2019). Vector clock. In *Wikipedia, The Free Encyclopedia*. Retrieved 21:52, Feb. 5, 2019, from https://en.wikipedia.org/w/index.php?title=Vector_clock&oldid=880371107; 3 pages, Jan. 27, 2019.

Wikipedia contributors. (May 16, 2018). Matrix clock. In *Wikipedia, The Free Encyclopedia*. Retrieved 21:52, Feb. 5, 2019, from https://en.wikipedia.org/w/index.php?title=Matrix_clock&oldid=841539991; 1 page, May 16, 2018.

Uefi, "Unified Extensible Firmware Interface (UEFI) Specification", Retrieved from <http://uefi.org> May 2017; 2899 pages, May 2017.

* cited by examiner

SYSTEM AND METHOD FOR PROVIDING QUALITY OF SERVICE DURING TRANSPORT KEY ROTATION AT A DISTRIBUTED MANAGEMENT CONTROLLER GROUP

BACKGROUND

Field of the Disclosure

This disclosure relates generally to information handling systems and more particularly to systems and methods for providing quality of service during transport key rotation in a group.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system.

SUMMARY

A secondary information handling system, which may be in the form of a management controller may communicate with other management controllers to form a distributed computing node group. The members or nodes in the group may message each other. However, malicious attacks may attempt to intercept or otherwise alter the messaging between the members or nodes. Thus, it may be desirable to support secure messaging between distributed computing nodes in a group.

Secure messaging may establish secure communication by negotiating an encryption key and exchanging the key before secure communication can begin. The encryption key may be rotated periodically to improve security. Key rotation may require secure communications to stop while a new key is established. Ongoing operations by members of the group may need to be interrupted to support rotation of the key. The demarcation point marking the key rotation may affect the quality of service in distributed computing node groups as all members of the group synchronize key exchange to transition to the new key. Thus, it may be desirable for distributed computing node groups to support key rotation without affecting the quality of service between members of the group.

During key rotation, one or more members of the distributed computing node group may be offline and may be unable to negotiate for the new key. When a member returns online, it may retain the previous key and be unable to rejoin the group because it lacks the new key. The member may need to perform additional actions to rejoin the group without providing the new key, which may reduce the quality of service to the member returning online and/or other members in the distributed computing node group. Thus, it may be desirable for a distributed computing node group to support key rotation without affecting quality of service when a member is offline during the key rotation and attempts to rejoin the group after returning online.

In one aspect, a disclosed method for providing quality of service of an information handling system includes generating a new transport encryption key for a management controller group, notifying nodes in the management controller group to negotiate for the new transport encryption key, and encrypting a first message to be sent to a first node in the management controller group using a current transport encryption key. The new transport encryption key may be for encrypted communications in the management controller group and may replace the current transport encryption key. The first message may be encrypted after notifying the nodes, which may include the first node, in the management controller group to negotiate for the new transport encryption key.

In certain embodiments, the method may include receiving a second message, decrypting the second message using the new transport encryption key, determining whether the decryption using the new transport encryption key was successful, and decrypting the second message using the current transport encryption key based on a determination that the decryption using the new transport encryption key was not successful. The method may include determining whether a grace period has expired based on an evaluation of an amount of time passed, and replacing the current encryption key with the new encryption key based on a determination that the grace period has expired. The amount of time passed may be associated with the notification of the nodes to negotiate for the new transport encryption key. The method may include determining whether all online nodes in the management controller group have used the new transport encryption key and replacing the current encryption key with the new encryption key based on a determination that all nodes in the management controller group have used the new transport encryption key. The method may include receiving a second message from a second node to rejoin the management controller group, and sending a third message to the second node in response to receiving the second message to rejoin the management controller group. The second node may be offline when notifying the nodes in the management controller group to negotiate for the new transport encryption key. The third message may include the current transport encryption key and the new transport encryption key.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
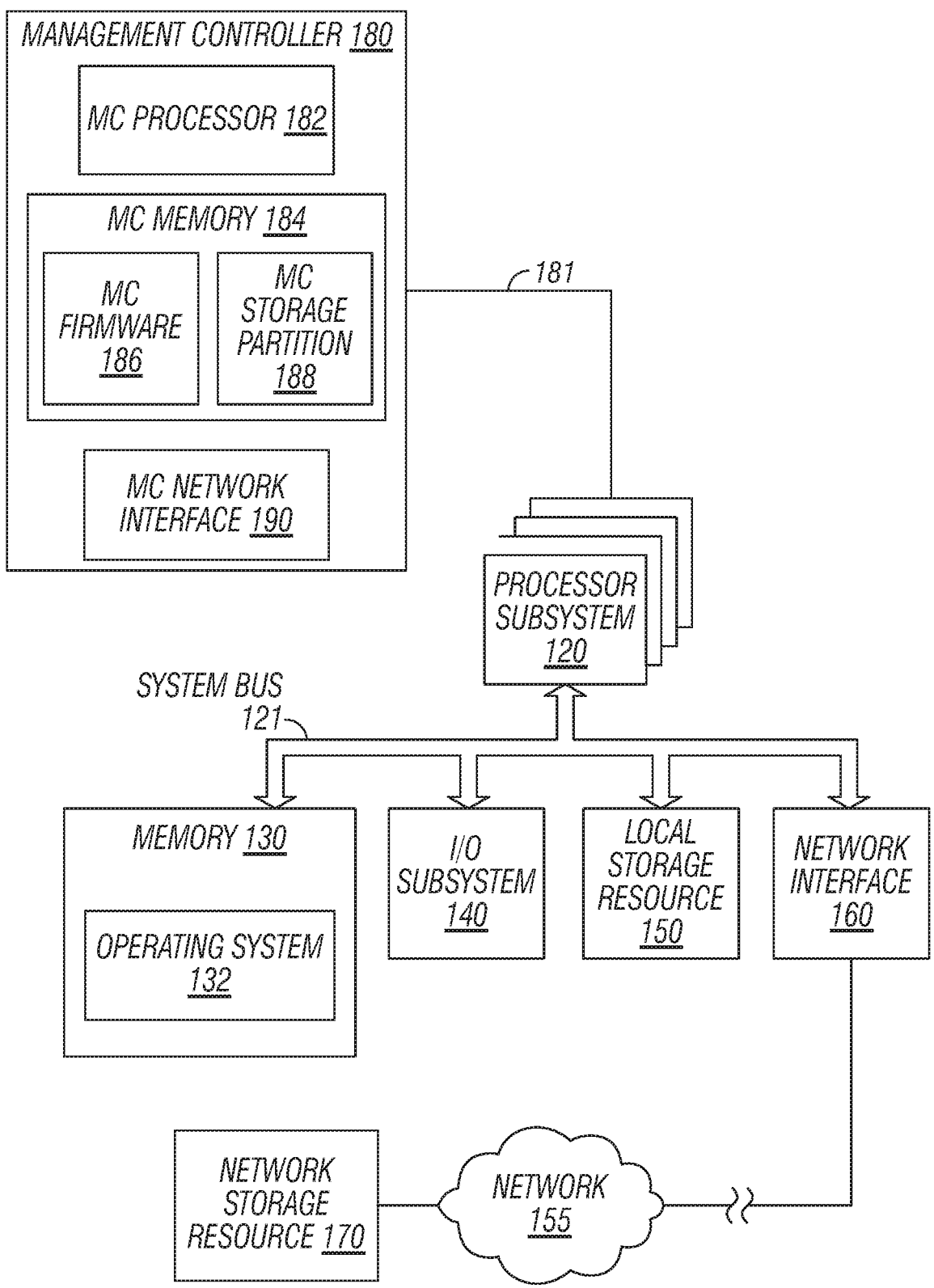
FIG. 1 is a block diagram of selected elements of an information handling system for providing quality of service during transport key rotation, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
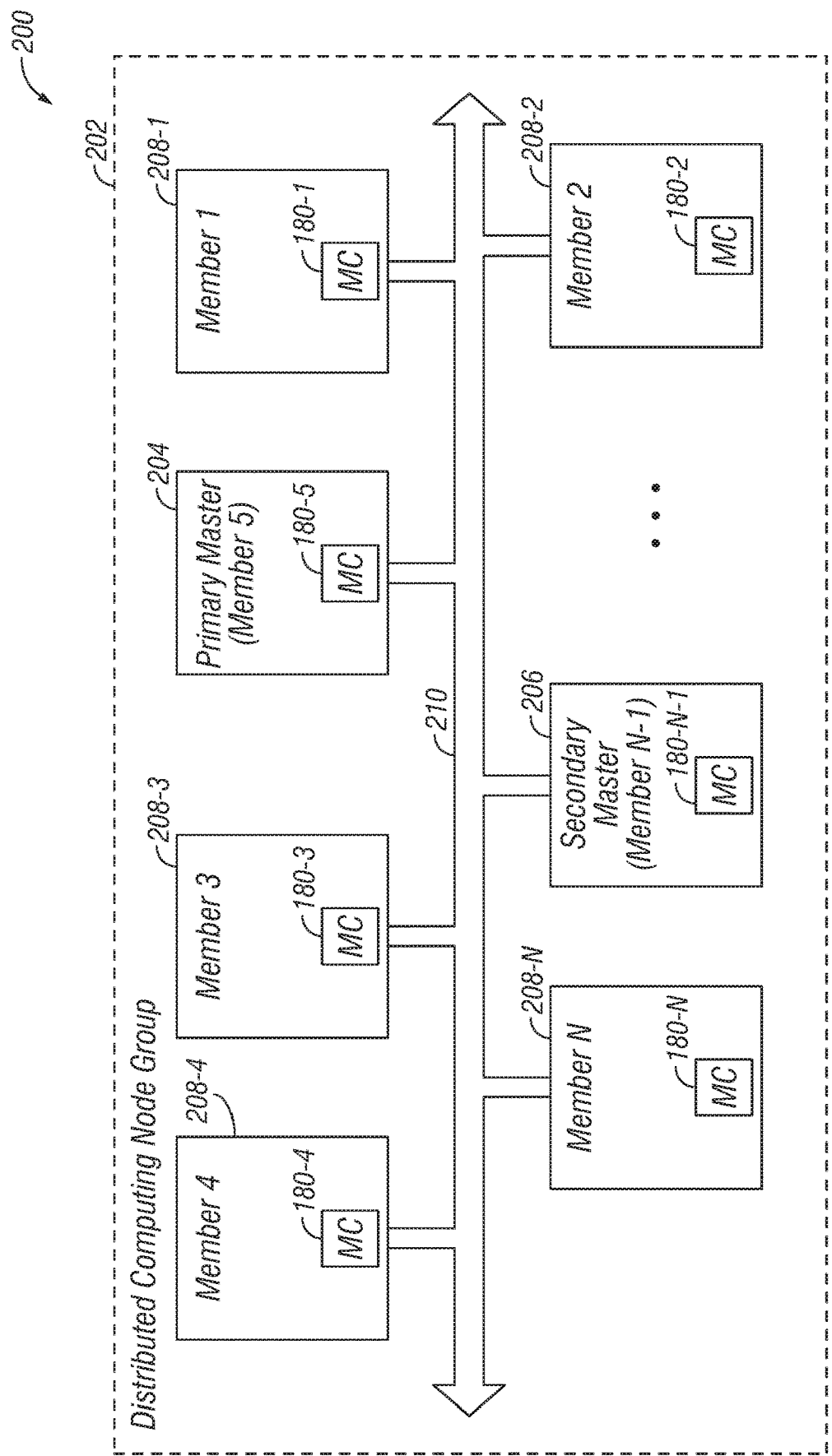
FIG. 2 is a block diagram of selected elements of a distributed computing node group for providing quality of service during transport key rotation, in accordance with some embodiments of the present disclosure.
Figure 3:
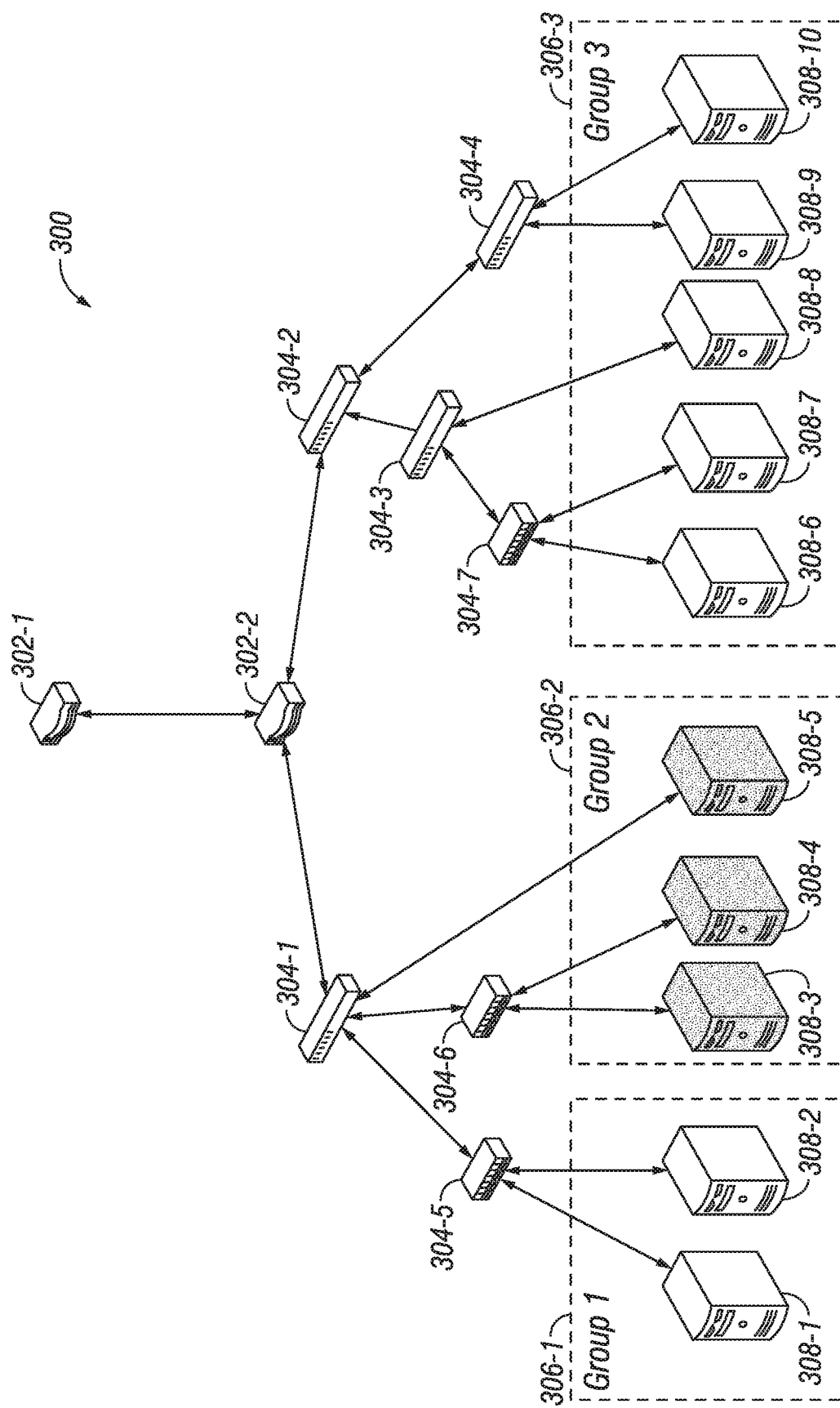
FIG. 3 is a block diagram of selected elements of distributed computing group hierarchy, in accordance with some embodiments of the present disclosure.

Particular embodiments are best understood by reference to FIGS. 1-3 wherein like numbers are used to indicate like and corresponding parts.

Turning now to the drawings, FIG. 1 illustrates a block diagram depicting selected elements of an embodiment of information handling system 100 for secure messaging. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware in processor subsystem 120). In the same or alternative embodiments, processor subsystem 120 may interpret and/or execute program instructions and/or process data stored remotely (e.g., in network storage resource 170).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190. The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system.

Management controller 180 may communicate with other management controllers using MC network interface 190. A set of management controllers in communication may form a group, in which each management controller may be a node. One of the management controllers in the group may operate as a group manager or a master. The master may facilitate and manage secure communication between the management controllers in the group. A set of groups in communication may form an aggregate group, in which each group may be a local group. Additional levels in the management controller hierarchy may be formed including, but not limited to, a bigger aggregate group including a set of aggregate groups.

A distributed computing node group supporting quality of service during transport key rotation may use a grace period to allow members to transition to a new key without impacting ongoing operations. For example, a member may complete a system update before negotiating for a new key with the master of the distributed computing node group. The master of the group may maintain a key rotation timer to be compared against the grace period to determine whether to replace the current key with the new key for messages being sent by the master. The key rotation timer may be reset in accordance with key rotation, such as when the new key is generated or when the master informs the members of the group to negotiate for the new key.

The distributed computing node group may include many members, which may be online or offline when the master informs the group to negotiate for a new key. Each member of the group that are online may negotiate for the new key after ongoing operations of the member have completed. For example, an ongoing operation may involve sending a message to another node in the group. As another example, an ongoing operation may involve updating a firmware of a component, which may require many messages. Members may send messages encrypted using the new key after negotiating with the master and may receive messages encrypted with the current key or the new key.

The master may send messages encrypted using the current key and may receive messages encrypted using the current key or the new key. The master may track which online members have rotated to a new key after the master informs the group to negotiate for a new key. For example, the master may use a key rotation map that maps the universally unique identifier (UUID) of a node to an indication of whether the node has rotated to a new key. The key rotation map may further map the UUID of the node to an indication of whether the node is online. The master may replace the current key with the new key when all members of the group that are online have rotated to the new key.

A distributed computing node group supporting quality of service during transport key rotation may use a group session transport encryption key counter to track the age of the group session transport encryption key. The counter may increment at a fixed interval, such as thirty seconds, or may increment each time a message is sent using the group session transport encryption key. When the counter exceeds a threshold, key rotation may be triggered. A grace period may be used for key rotation. During the grace period, the current group session transport encryption key and the new group session transport encryption key may be used by members of the group. The current group session transport encryption key may be released once the grace period expires or the master sends an outgoing message encrypted using the new group session transport encryption key. Messages sent after the current group session transport encryption key is released may be encrypted using the new group session transport encryption key.

During key rotation, the master of the group may inform members of the group to negotiate for the new group session transport encryption key. Outgoing messages may be encrypted by the master using the current group session transport encryption key and incoming message may be decrypted by the master using the current group session transport encryption key and/or the new group session transport encryption key. For example, the master may attempt to decrypt an incoming message using the new group session transport encryption key and decrypt the incoming message using the current group session transport encryption key if decryption with the new group session transport encryption key fails. If all online members of the group have rotated to the new group session transport encryption key or the grace period has expired, the master may release the current group session transport encryption key and encrypt outgoing messages using the new group session transport encryption key.

Members of the group may negotiate for the new group session transport encryption key when ongoing operations have completed. For example, a member may be performing a system update, which may require many messages to be communicated. In this case, the member may negotiate for the new group session transport encryption key after the system update is completed. During key rotation, the member may continue to use the current group session transport encryption key for outgoing messages until negotiating for the new group session transport encryption key. After a member has negotiated for a new group session transport encryption key, the member may use the new group session transport encryption key for outgoing messages. Incoming messages received by the member may be decrypted using the new group session transport encryption key and/or the current group session transport encryption key. For example, the member may attempt to decrypt the incoming message using the new group session transport encryption key if decryption with the current group session transport encryption key fails.

Members of the group that were offline when the master notified members of the group to negotiate for the new group session transport encryption key may negotiate with the master when returning back online. After the returning member is authenticated to communicate with the master, the master may send the member the current group session transport encryption key and the new group session transport encryption key.

Referring now to FIG. 2, a block diagram of selected elements of a distributed computing node group 202 is shown in accordance with some embodiments of the present disclosure. A set of information handling systems 200 may be grouped together to form a distributed computing node group 202. Group 202 may include a plurality of members 208 connected together with messaging channel 210. Although group 202 is shown with seven members, group 202 may include any number of members suitable to form a distributed computing node group.

Each member 208 may include a management controller 180 to manage group communications. Members 208 and/or management controllers 180 may use messaging channel 210 to send and receive messages to each other. The messages may be unencrypted, encrypted, signed, or unsigned. Messaging channel 210 may include any suitable interface between management controllers, including but not limited to a network interface, such as Ethernet, and an I/O interface, such as PCI-E. Group 202 may use secure messaging with a group session transport encryption key that rotates to improve the security of communications between members 208.

Group 202 may also include a member 208 that is a master, such as a primary master 204 and/or a secondary master 206. The master may control and/or manage group 202. Control of group 202 may include the addition and/or removal of members from group 202, and/or authenticating members of group 202 when the member transitions to an online state from an offline state. The master may perform any operation sufficient to control or manage distributed computing node group 202. For example, the primary master may be selected at random. As another example, the primary master may be selected using the timestamp of entry into the group, in which the most recent member to join the group or the least recent member to join the group is elected the primary master. The secondary master 206 may serve as the master when the primary master is offline or unavailable. The election or selection of the secondary master 206 may be performed in a similar manner as the primary master.

Each member (204, 206, 208) in distributed computing node group 202 may maintain a node timestamp, which may include message counters, such as shout counters and whisper counters. Shout counters may include an outgoing shout counter for the group and an incoming shout counter for the group. Whisper counters may include an outgoing whisper counter and an incoming whisper counter for each member in the group. For example, if a group contains four members, the node timestamp for each member may include a set of shout counters and three sets of whisper counters. In this example, the set of shout counters may include an outgoing shout counter and an incoming shout counter, and the three sets of whisper counters may include a set for other members of group 202, in which each set corresponds to another member in group 208 and includes an outgoing counter and incoming counter. The shout counters and whisper counters may be reset across group 202 in response to the occurrence of a specific group event, such as the rotation of the group session transport encryption key or the assignment of a new group master.

An outgoing shout counter may be incremented when broadcasting a message to group 202 and the incoming whisper counter may be incremented when receiving a message broadcast to group 202 by another member of the group. When sending a shout to group 202, a member may increment the outgoing shout counter and broadcast the message over messaging channel 210. The message may include the outgoing shout counter that has been incremented and the incoming shout counter. Other members in group 202 may receive the message, perform decryption, and compare the incremented outgoing shout counter to a locally stored incoming shout counter. One or more receiving members may discard the message if the incremented outgoing shout counter is less than the locally stored incoming shout counter. If the message is not discarded, the receiving members may update the locally stored incoming shout counter.

An outgoing whisper counter may be incremented when sending a message to a particular member in the group and an incoming whisper counter may be incremented when receiving a message to a particular member in group 202. When sending a message to a particular member of group 202, a member may increment the outgoing whisper counter to the particular member and send a message to the member over messaging channel 210. The message may include the outgoing whisper counter that has been incremented and the incoming whisper counter for the particular member. The member may receive the message, perform decryption, and compare the incremented outgoing whisper counter to a locally stored incoming whisper counter for the member that sent the message. The receiving member may discard the message if the incremented outgoing whisper counter is less than the locally stored incoming whisper counter for the member that sent the message. If the message is not discarded, the receiving member may update the locally stored incoming whisper counter.

Referring now to FIG. 3, a block diagram of selected elements of a distributed group hierarchy is shown in accordance with some embodiments of the present disclosure. The distributed group 300 may include a one or more routers 302, which form part of a network. The network may be a public and/or private network. Router 302-2 may route data between different distributed groups and/or within a distributed group. The distributed group 300 may also include one or more switches 304. Downstream of the routers, switches 304-1 and 304-2 may interface exclusively with other switches (304-3, 304-4, 304-5, 304-6 and 304-7). The switches 304 and routers 302 may collectively operate to facilitate the transmission of messages between the nodes in the distributed group.

The nodes may be grouped together to perform a particular type of function. For example, group 306-1 may include two information handling systems 308-1 and 308-2, which may be used for a SharePoint application. Group 306-2 may include three information handling systems 308-3, 308-4, and 308-5, which may be used for file and print operations. Group 306-3 may include five information handling systems 308-6, 308-7, 308-8, 308-9, and 308-10, which may be used for running various other applications. Each group may be uniquely identified through one or more attributes including, but not limited to, group name, universally unique identifier (UUID), or group passcode. Although a particular number of information handling systems are shown, one or more information handling systems may be configured to form one or more portions of a group or one or more groups. For example, groups 306-1, 306-2, and 306-3 may be subsystems within the same information handling system, such as a virtualized environment operating on the information handling system.

Figure 4:
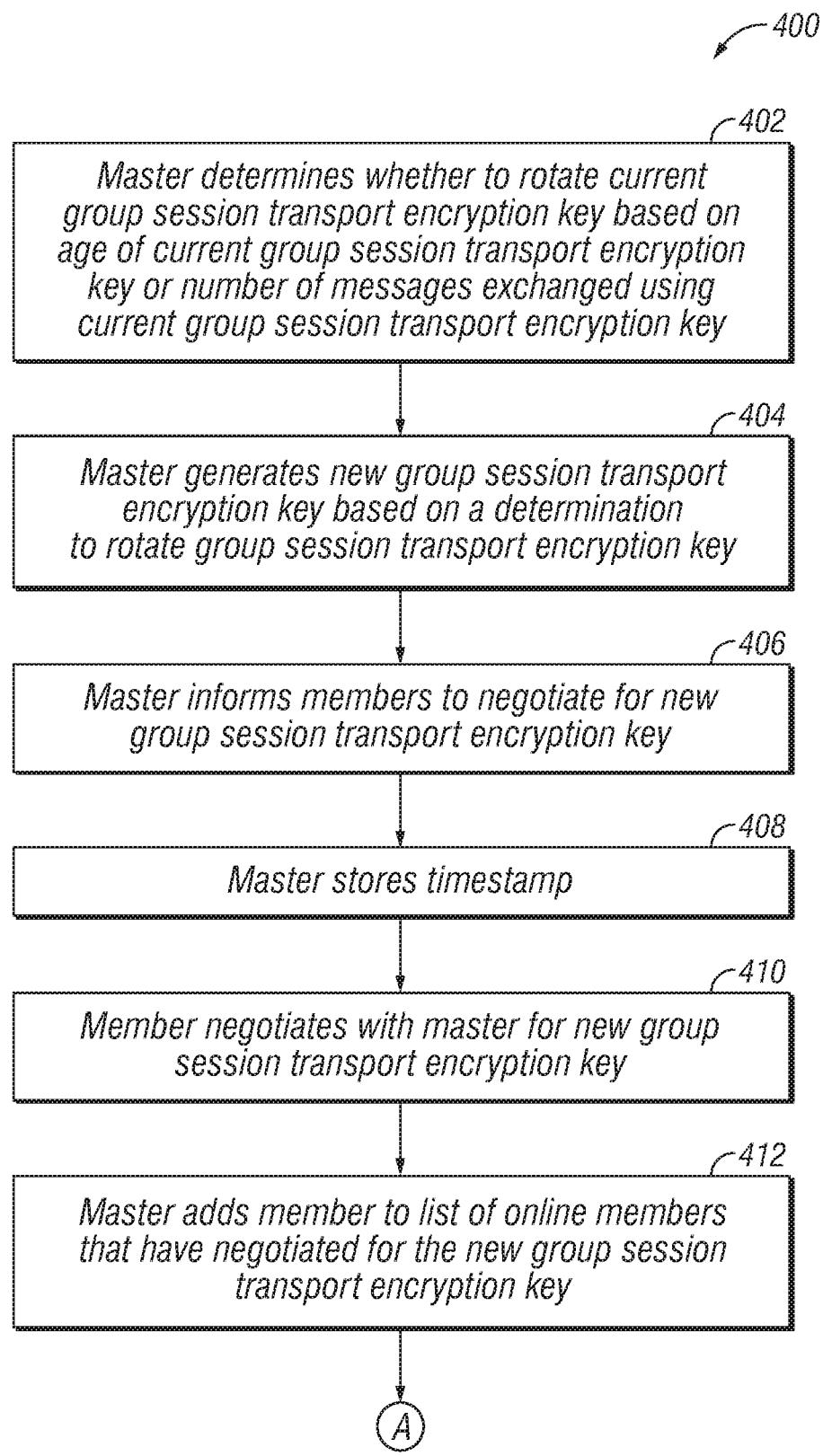
FIG. 4 is a flow chart depicting selected elements of a method for providing quality of service during transport key rotation, in accordance with some embodiments of the present disclosure.
Figure 4:
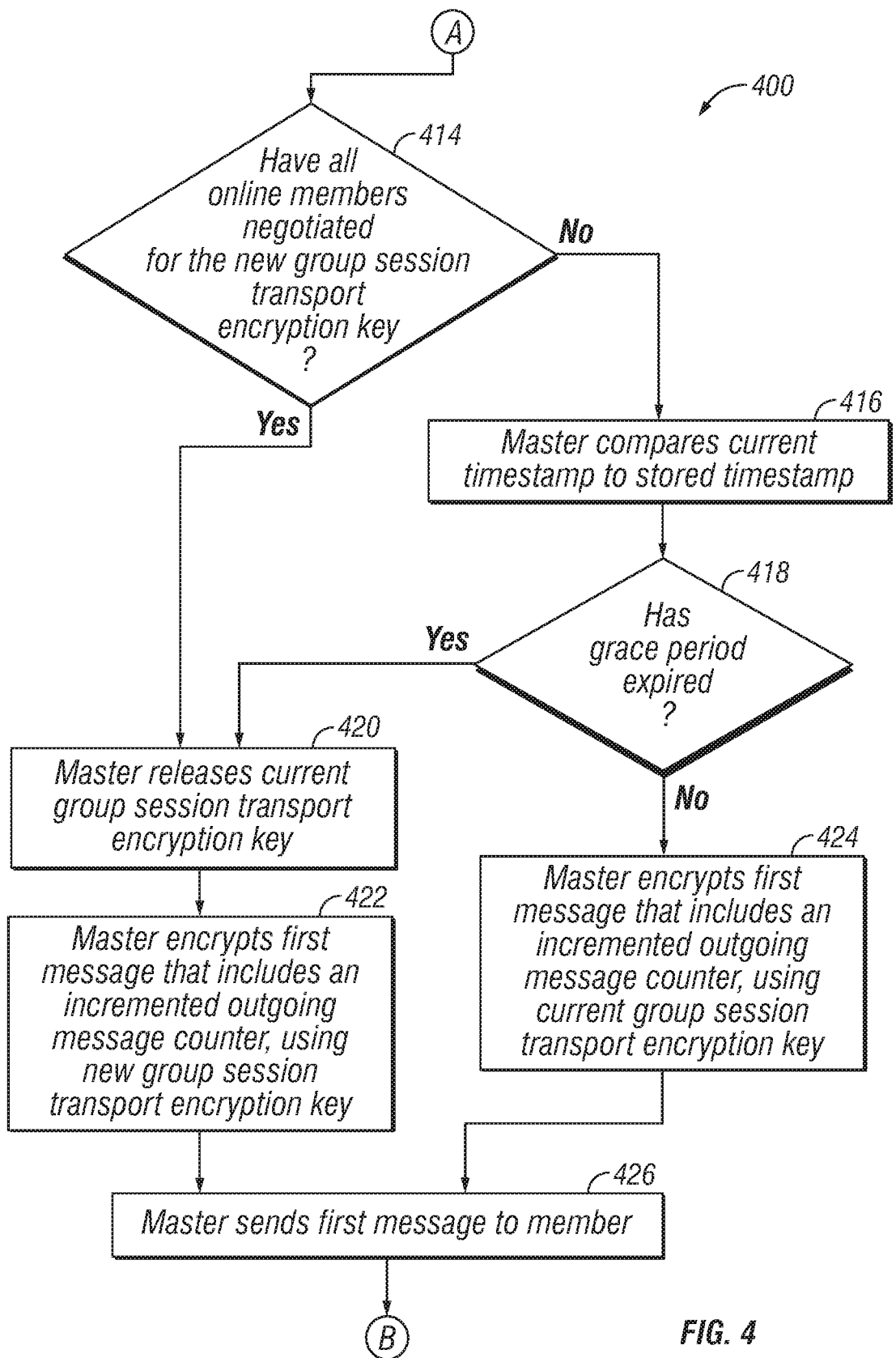
Figure 4:
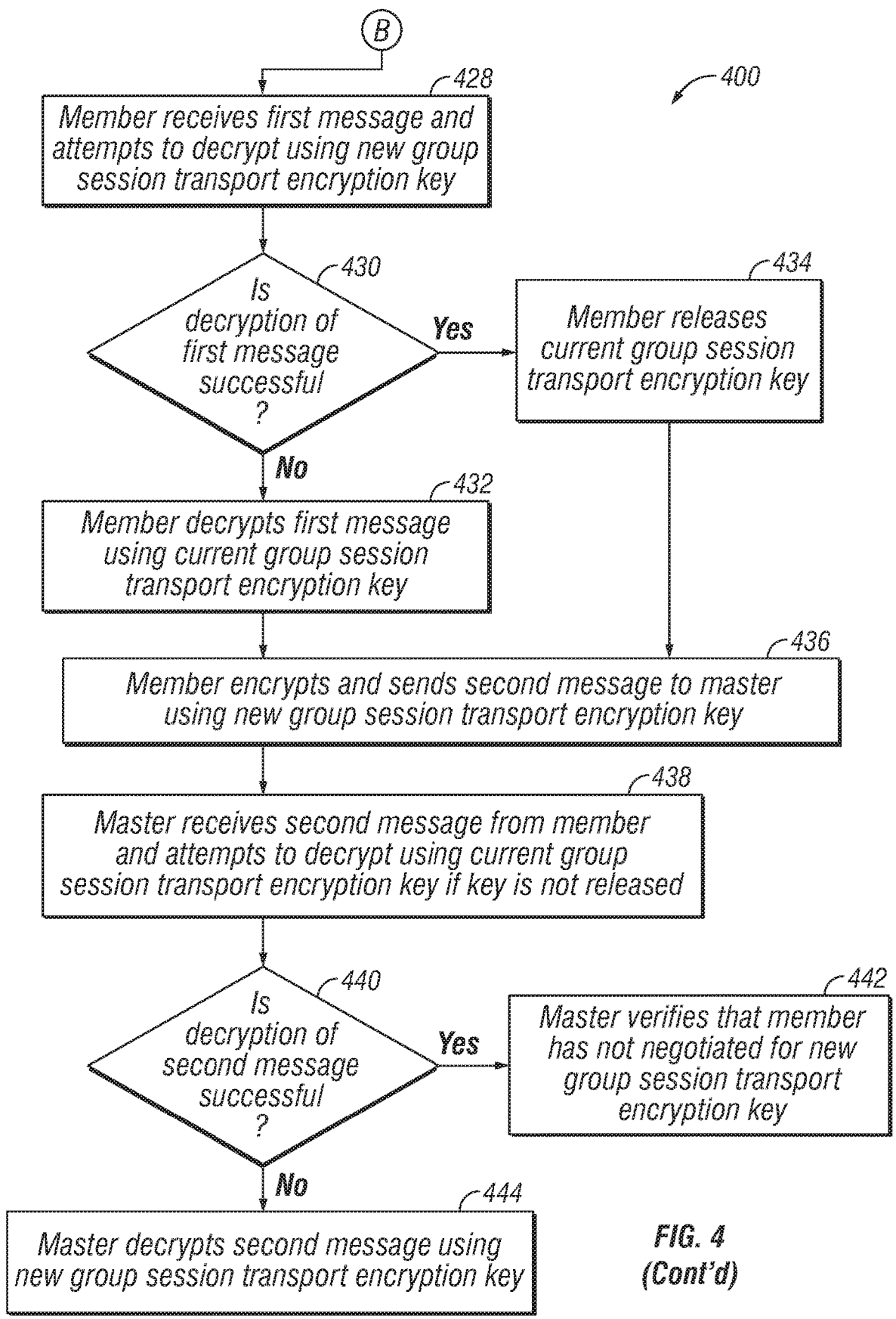

Referring now to FIG. 4, a flow chart depicting selected elements of a method for providing quality of service during transport key rotation is shown in accordance with some embodiments of the present disclosure. Method 400 may be implemented by any of the elements shown in FIGS. 1-3. Method 400 may be initiated by any suitable criteria and may initiate operation at any suitable point. In one embodiment, method 400 may initiate operation at 402. Method 400 may include greater or fewer steps than those illustrated. Moreover, method 400 may execute its steps in an order that is different than those illustrated below. Method 400 may terminate at any suitable step. Moreover, method 400 may repeat operation at any suitable step. Portions of method 400 may be performed in parallel and repeat with respect to other portions of method 400.

At 402, the master of the distributed computing node group may determine whether to rotate the current group session transport encryption key based on the age of the current group session transport encryption key or the number of messages exchanged using the current group session transport encryption key. The age of the current group session transport encryption key may be defined by a fixed or variable period of time. If the current group session transport encryption key exceeds the defined period of time, the master may determine to rotate the key. The number of messages exchanged using the current group session transport encryption key may be determined by the number of messages sent by the master to a member of the distributed computing node group and/or the number of messages sent by a member to the master.

At 404, the master may generate a new group session transport encryption key based on a determination to rotate the group session transport encryption key. At 406, the master may inform members of the distributed computing node group to negotiate for the new group session transport encryption key. The master may inform the group by shouting a message to all members of the group or by whispering messages to each member of the group. At 408, the master may store a timestamp associated with the generation of the new group session transport encryption key or the notification to members of the group to negotiate for the new group session transport encryption key. The timestamp may be used to determine whether the grace period for rotating to the new group session transport encryption key has expired.

At 410, a member of the distributing computing node group may negotiate with the master of the group for the new group session transport encryption key. The negotiation may require that the member provide information to the master that is encrypted using the current group session transport encryption key. The member may delay the negotiation until after it has completed any ongoing operations. For example, the member may be performing a system update of an information handling system. The system update may require one or more messages, which are encrypted using the current group session transport encryption key, be transmitted within the distributed computing node group. After negotiating for the new group session transport encryption key, the member may retain the current group session transport encryption key and new group session transport encryption key. The member may encrypt outgoing messages using the new group session transport encryption key and may decrypt incoming messages using the current group session transport encryption key or the new group session transport encryption key. When the member determines that the master has communicated a message that is encrypted using the new group session transport encryption key, the member may release the current group session transport encryption key or replace the current group session transport encryption key with the new group session transport encryption key to discontinue the ability to decrypt incoming messages using the current group session transport encryption key.

At 412, the master may track which online members have negotiated for the new group session transport encryption key. For example, the master may add the member to a key rotation list of online members that have negotiated for the new group session transport encryption key. As another example, the master may insert an entry in a key rotation map that maps a member, which may be identified by a universally unique identifier (UUID), to one or more pieces of information, such as whether the member is online and/or whether the member has negotiated for the new group session transport encryption key. At 414, the master may determine whether all online members have negotiated for the new group session transport encryption key. The master may use the information collected for tracking members of the distributing computing node group to make the determination. For example, the master may determine which members of the group are online and have not negotiated for the new group session transport encryption key by using a key rotation list or a key rotation map. If all online members have negotiated for the new key, method 400 may proceed to 420. Otherwise, method 400 may proceed to 416. At 416, the master may compare a current timestamp to the stored timestamp. At 418, the master may determine whether the grace period has expired. The master may perform the determination using the comparison between the current timestamp and the stored timestamp. For example, if the difference between the current timestamp and the stored timestamp is greater than the grace period, the master may determine the grace period has expired and method 400 may proceed to 420. Otherwise, method 400 may proceed to 424.

At 420, the master may release the current group session transport encryption key or replace the current group session transport encryption key with the new group session transport encryption key based on a determination that the grace period has expired. Once the master has released the current group session transport encryption key, online members of the group that may not have negotiated for the new transport encryption key, may still maintain secure communication with the group by authenticating with the master to receive the new transport encryption key. At 422, the master may encrypt a first message, which may include an incremented outgoing message counter, using the new group session transport encryption key. The first message may be a whisper that is intended only for receipt by the member or a shout that is intended to be broadcast to the group. The first message may contain a node timestamp with one or more incoming message counters and/or one or more outgoing message counters. For example, the node timestamp may include a set of shout counters, which may include an incoming shout counter and an outgoing shout counter, and one or more sets of whisper counters, in which each set may include an incoming whisper counter and an outgoing whisper counter. If the first message is a whisper, the outgoing whisper counter corresponding to intended receiving member may be incremented prior to encryption. If the first message is a shout, the outgoing shout counter may be incremented prior to encryption. The first message may be encrypted with the new group session transport encryption key or the new group session transport encryption key may be used to generate a message encryption key to encrypt the first message. For example, a message key may be derived using the new group session transport encryption key and a low entropy information, such as a seed. In this case, the first message may be encrypted with the message key and may include the low entropy information, which may be encrypted with the new group session transport encryption key.

At 424, the master may encrypt the first message, which may include an incremented outgoing message counter as described above for 422. The first message may be encrypted using the current group session transport encryption key. The first message may be encrypted with the current group session transport encryption key or the current group session transport encryption key may be used to generate a message encryption key to encryption the first message. At 426, the master may send the first message to the member. The first message may be a whisper that is intended only for receipt by the member or a shout that is intended to be broadcast to the group. At 428, the member may receive the first message and attempt to decrypt the first message using the new group session transport encryption key. At 430, the member may determine whether decryption of the first message is successful. For example, the member may determine whether the decryption is successful by evaluating information within the decrypted data. Successful decryption may require a portion of the information to be readable text or any suitable portion of the information to be in a pre-determined format or to have pre-determined data including, but not limited to a header of the message being properly formed according to a pre-determined format. If the decryption is not successful, method 400 may proceed to 432. Method 400 otherwise may proceed to 434.

At 432, the member may decrypt the first message using the current group session transport encryption key based on a determination that decryption using the new group session transport encryption key was not successful. At 434, the member may release the current group session transport encryption key or replace the current group session transport encryption key with the new group session transport encryption key based on a determination that decryption using the new group session transport encryption key was successful. The member may no longer use the current group session transport encryption key for decrypting incoming messages once the current group session transport encryption key has been released. At 436, the member may encrypt a second message using the new group session transport encryption key and send the second message to the master. The second message may be whisper to be received only by the master. In addition, the member may encrypt the message using a message key. The message key may be derived from the new group session transport encryption key and a seed, which may be based on low entropy information. Within the second message, the message key may encrypt the contents of the message and the new group session transport encryption key may encrypt the low entropy information.

At 438, the master may receive the second message from the member and attempt to decrypt the second message using the current group session transport encryption key if the master has not yet released the current group session transport encryption key. However, if the master has released the current group session transport encryption key, method 400 may proceed to 444. At 440, the master may determine whether decryption of the second message using the current group session transport encryption key was successful. If decryption was successful, method 400 may proceed to 442. Otherwise, method 400 may proceed to 444. At 442, the master may verify that the member has not negotiated for the new group session transport encryption key. The verification may involve looking up the member in a list or map. The master may perform any suitable corrective action if the member has negotiated for the new group session transport encryption key but has used the current group session transport encryption key to encrypt the second message. Suitable correction actions include, but are not limited to, raising an exception, logging an error, and ignoring the second message from the member. At 444, the master may decrypt the second message using the new group session transport encryption key based on a determination that decryption of the second message using the current group session transport encryption key was not successful or a determination that the current group session transport encryption key has been released or replaced.

Figure 5:
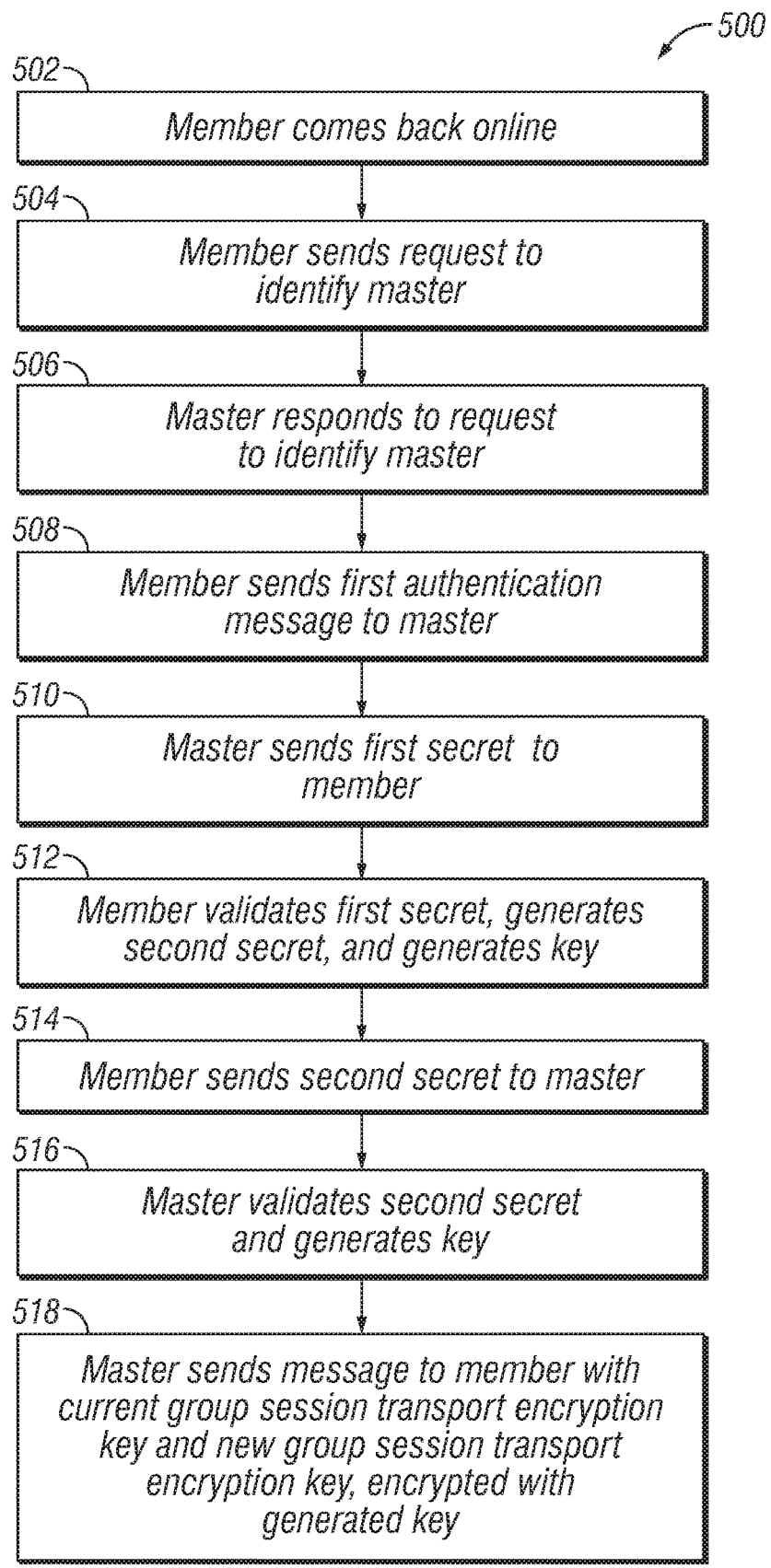
FIG. 5 is a flow chart depicting selected elements of a method for transport key rotation for offline members, in accordance with some embodiments of the present disclosure.

Referring now to FIG. 5, a flow chart depicting selected elements of a method for providing transport key rotation for offline members is shown in accordance with some embodiments of the present disclosure. Method 500 may be implemented by any of the elements shown in FIGS. 1-4. Method 500 may be initiated by any suitable criteria and may initiate operation at any suitable point. In one embodiment, method 500 may initiate operation at 502. Method 500 may include greater or fewer steps than those illustrated. Moreover, method 500 may execute its steps in an order that is different than those illustrated below. Method 500 may terminate at any suitable step. Moreover, method 500 may repeat operation at any suitable step. Portions of method 500 may be performed in parallel and repeat with respect to other portions of method 500.

At 502, a member of a distributed computing node group may come back online. The member may have been offline when a master of the group notified members of the group to negotiate for a new group session transport encryption key. At 504, the member may send a request to the group to identify the master. The request may be a shout message broadcast to all members of the group. At 506, the master may identify itself as the master of the group by responding to the request. At 508, the member may send a first authentication message to the master. The authentication message may contain a value based on a shared group passcode. At 510, the master may send the first secret to the member after receiving the first authentication message from the member. The first secret may be based on the shared group passcode. At 512, the member may validate the first secret, generate the second secret, and generate an encryption key based on the successful validation of the first secret. The second secret may be based on the shared group passcode. At 514, the member may send the second secret to the master. At 516, the master may validate the second secret and generate an encryption key based on the successful validation of the second secret. Successful validation of the second secret may include locally generating the second secret at the master and comparing the locally generated secret to the second secret to validate that they match. At 518, the master may send a message to the member with the current group session transport encryption key and the new group session transport encryption key. The message may be encrypted with the generated encryption key.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing quality of service of an information handling system, comprising:
   generating a new transport encryption key for a management controller group, the new transport encryption key for encrypted communications in the management controller group;
   notifying, by a master of the management controller group, nodes in the management controller group to negotiate for the new transport encryption key, the new transport encryption key to replace a current transport encryption key;
   encrypting, by the master of the management controller group, a first message to be sent to a first node in the management controller group using the current transport encryption key, the first message encrypted after notifying the nodes in the management controller group to negotiate for the new transport encryption key, the nodes of the management controller group including the first node;

receiving a second message at the master of the management controller group, the second message received from the first node after notifying the nodes in the management controller group to negotiate for the new transport encryption key and before the first message is encrypted by the master;

decrypting the second message using the current transport encryption key;

determining whether the decryption using the current transport encryption key was successful; and decrypting the second message using the new transport encryption key based on a determination that the decryption using the current transport encryption key was not successful.

2. The method of claim 1, further comprising:

determining whether a grace period has expired based on an evaluation of an amount of time passed, the amount of time passed associated with the notification of the nodes to negotiate for the new transport encryption key; and replacing the current transport encryption key with the new transport encryption key based on a determination that the grace period has expired.

3. The method of claim 1, further comprising:

determining whether all online nodes in the management controller group have used the new transport encryption key; and replacing the current transport encryption key with the new transport encryption key based on a determination that all nodes in the management controller group have used the new transport encryption key.

4. The method of claim 1, further comprising:

receiving a third message from a second node to rejoin the management controller group, the second node offline when notifying the nodes in the management controller group to negotiate for the new transport encryption key; and sending a fourth message to the second node in response to receiving the second message to rejoin the management controller group, the fourth message including the current transport encryption key and the new transport encryption key.

5. The method in claim 1, wherein the decryption of the second message using the new transport encryption key further uses a message encryption key, the message encryption key specific to the second message and derived from at least the new transport encryption key.

6. An information handling system, comprising:

a processor subsystem having access to a first memory;

a management controller comprising a secondary processor having access to a second memory, the second memory including an embedded storage partition and the second memory storing instructions executable by the secondary processor to:

generate a new transport encryption key for a management controller group, the new transport encryption key for encrypted communications in the management controller group;

notify, by a master of the management controller group, nodes in the management controller group to negotiate for the new transport encryption key, the new transport encryption key to replace a current transport encryption key;

encrypt, by the master of the management controller group, a first message to be sent to a first node in the management controller group using the current transport encryption key, the first message encrypted after the nodes in the management controller group are notified to negotiate for the new transport encryption key, the nodes of the management controller group including the first node;

receive a second message at the master of the management controller group, the second message received from the first node after the nodes in the management controller group are notified to negotiate for the new transport encryption key and before the first message is encrypted by the master;

decrypt the second message using the current transport encryption key;

determine whether the decryption using the current transport encryption key was successful; and decrypt the second message using the new transport encryption key based on a determination that the decryption using the current transport encryption key was not successful.

7. The information handling system of claim 6, further comprising instructions executable by the secondary processor to:

determine whether a grace period has expired based on an evaluation of an amount of time passed, the amount of time passed associated with the notification of the nodes to negotiate for the new transport encryption key; and replace the current transport encryption key with the new transport encryption key based on a determination that the grace period has expired.

8. The information handling system of claim 6, further comprising instructions executable by the secondary processor to:

determine whether all online nodes in the management controller group have used the new transport encryption key; and replace the current transport encryption key with the new transport encryption key based on a determination that all nodes in the management controller group have used the new transport encryption key.

9. The information handling system of claim 6, further comprising instructions executable by the secondary processor to:

receive a third message from a second node to rejoin the management controller group, the second node offline when the nodes in the management controller group are notified to negotiate for the new transport encryption key; and send a fourth message to the second node, the fourth message including the current transport encryption key and the new transport encryption key.

10. The information handling system of claim 6, wherein the first message includes an outgoing whisper counter corresponding to the first node, the outgoing whisper counter incremented before the first message is encrypted.

11. The information handling system of claim 6, wherein the decryption of the second message using the new transport encryption key further uses a message encryption key, the message encryption key specific to the second message and derived from at least the new transport encryption key.

12. A management controller for an information handling system having a primary processor and a primary memory, the management controller comprising a secondary processor having access to a secondary memory, the secondary memory including an embedded storage partition and the secondary memory storing instructions executable by the secondary processor to:

generate a new transport encryption key for a management controller group, the new transport encryption key for encrypted communications in the management controller group;

notify, by a master of the management controller group, nodes in the management controller group to negotiate for the new transport encryption key, the new transport encryption key to replace a current transport encryption key;

encrypt, by the master of the management controller group, a first message to be sent to a first node in the management controller group using the current transport encryption key, the first message encrypted after the nodes in the management controller group are notified to negotiate for the new transport encryption key, the nodes of the management controller group including the first node;

receive a second message at the master of the management controller group, the second message received from the first node after the nodes in the management controller group are notified to negotiate for the new transport encryption key and before the first message is encrypted by the master;

decrypt the second message using the current transport encryption key;

determine whether the decryption using the current transport encryption key was successful; and decrypt the second message using the new transport encryption key based on a determination that the decryption using the current transport encryption key was not successful.

13. The management controller of claim 12, further comprising instructions executable by the secondary processor to:

determine whether a grace period has expired based on an evaluation of an amount of time passed, the amount of time passed associated with the notification of the nodes to negotiate for the new transport encryption key; and replace the current transport encryption key with the new transport encryption key based on a determination that the grace period has expired.

14. The management controller of claim 12, further comprising instructions executable by the secondary processor to:

determine whether all online nodes in the management controller group have used the new transport encryption key; and replace the current transport encryption key with the new transport encryption key based on a determination that all nodes in the management controller group have used the new transport encryption key.

15. The management controller of claim 12, further comprising instructions executable by the secondary processor to:

receive a third message from a second node to rejoin the management controller group, the second node offline when the nodes in the management controller group are notified to negotiate for the new transport encryption key; and send a fourth message to the second node, the fourth message including the current transport encryption key and the new transport encryption key.

16. The management controller of claim 12, wherein the first message includes an outgoing whisper counter corresponding to the first node, the outgoing whisper counter incremented before the first message is encrypted.

17. The management controller of claim 12, wherein the decryption of the second message using the new transport encryption key further uses a message encryption key, the message encryption key specific to the second message and derived from at least the new transport encryption key.

* * * * *